INVENTOR.
Francis H. Clute
BY
*Hovey, Schmidt, Johnson & Hovey*
ATTORNEYS.

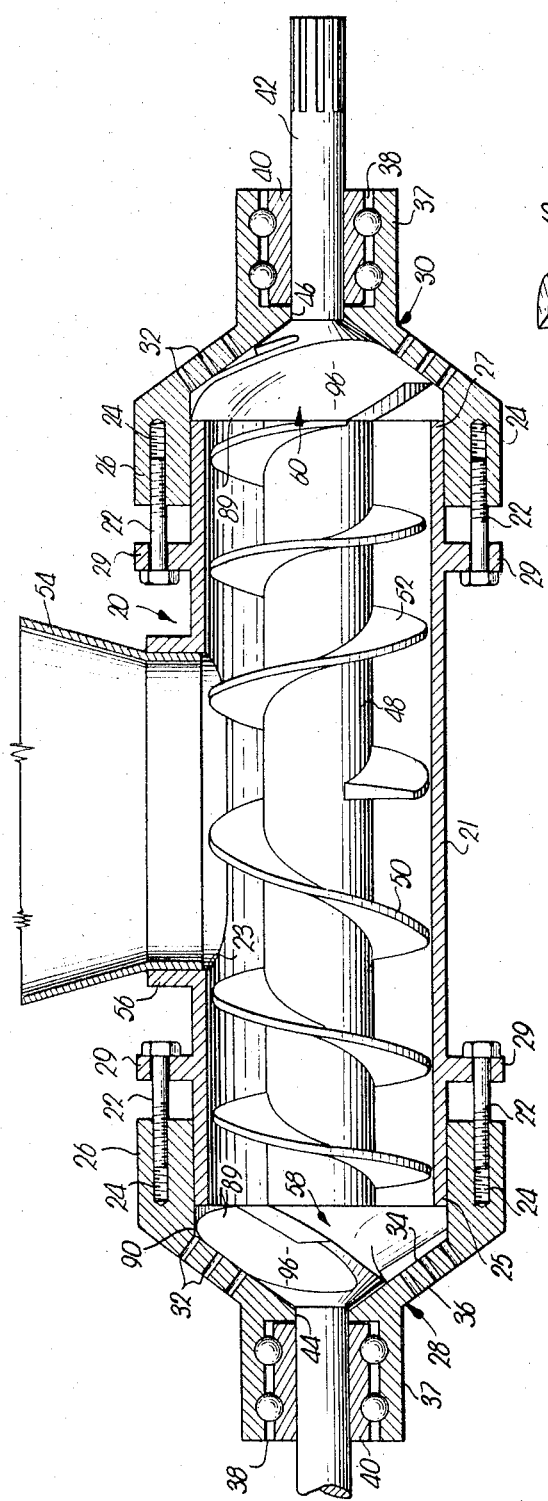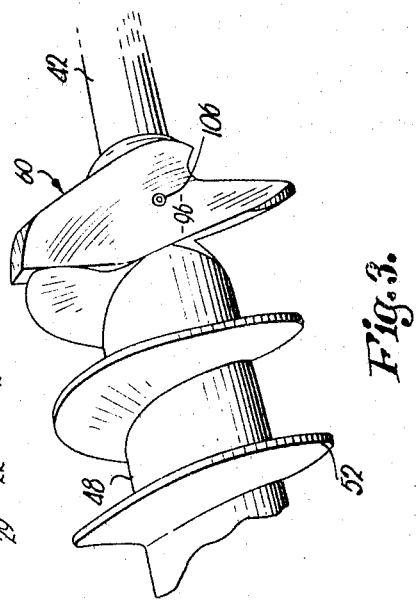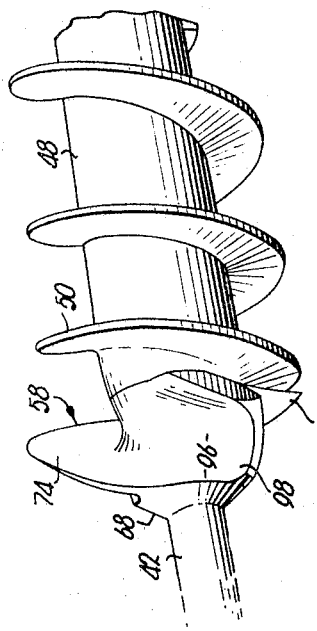

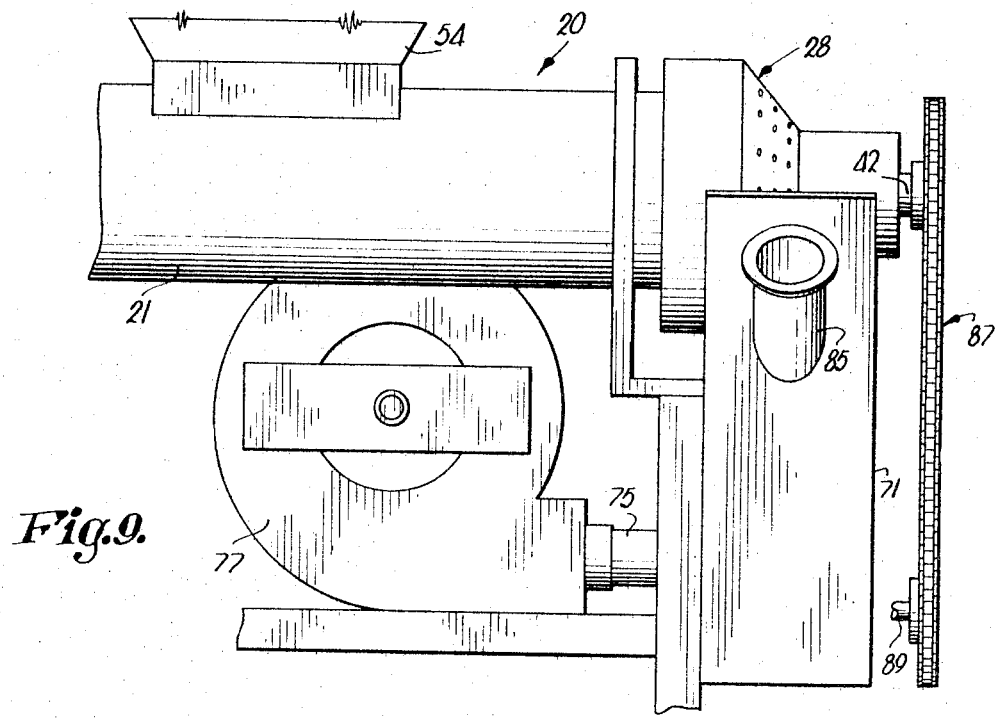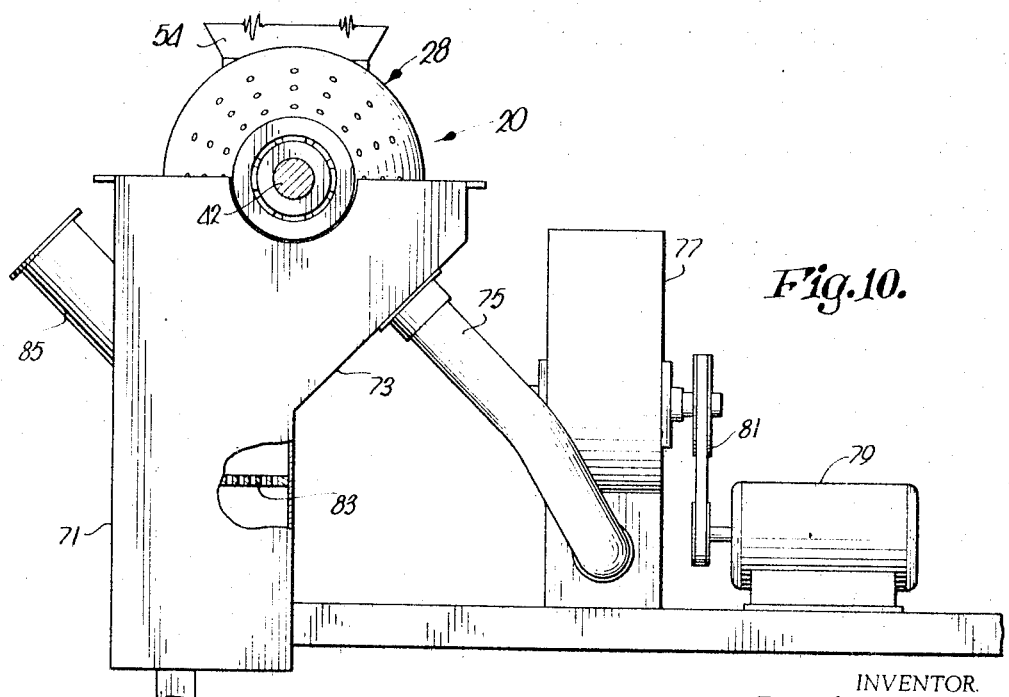

Feb. 21, 1967   F. H. CLUTE   3,304,578
PELLETING MACHINE
Filed Dec. 29, 1964   5 Sheets-Sheet 5
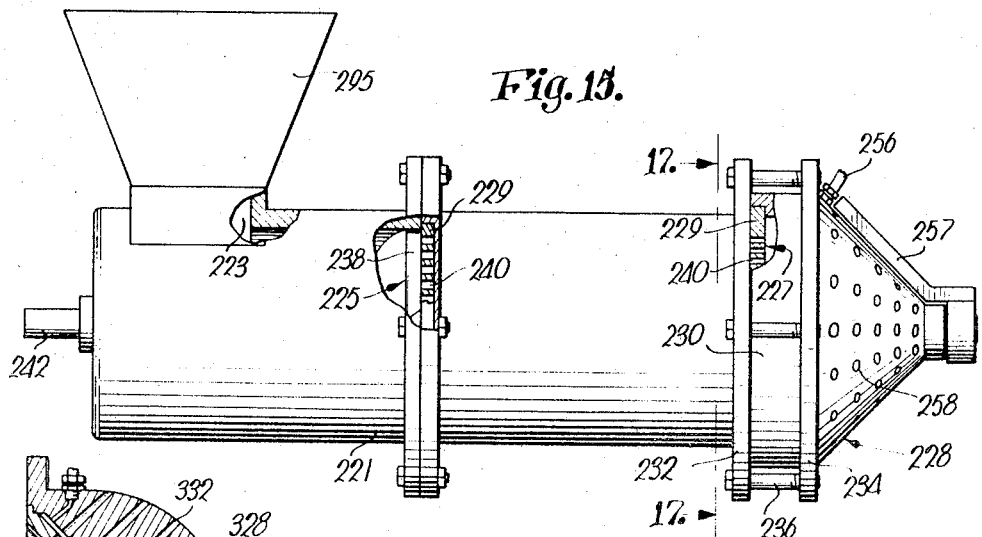
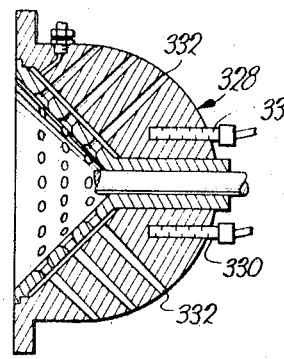
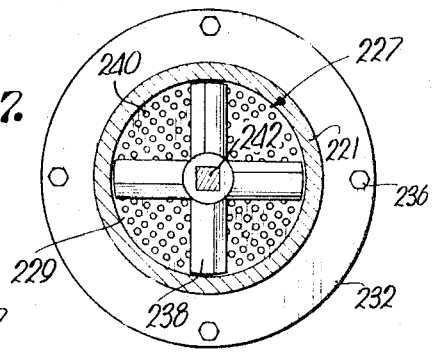
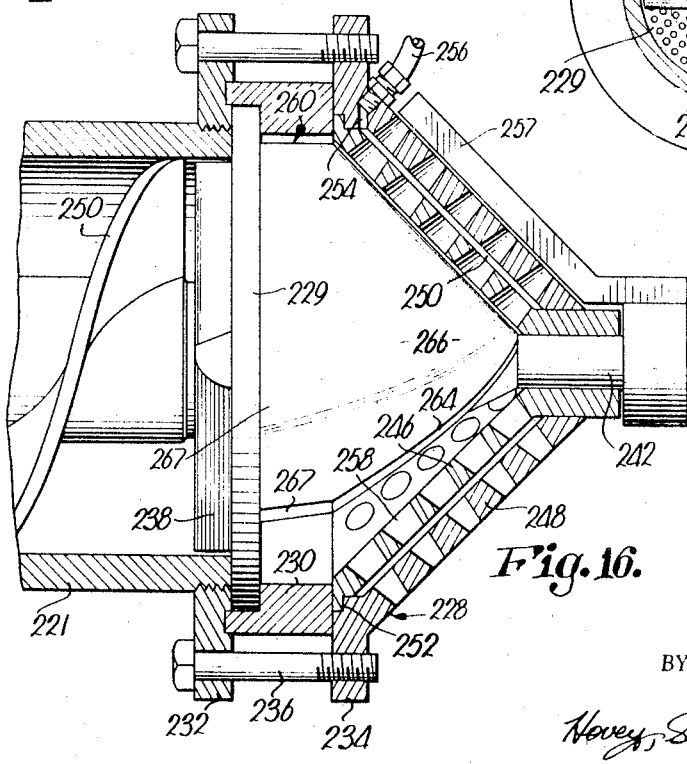
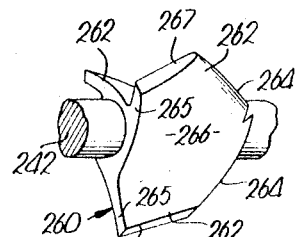
INVENTOR.
Francis H. Clute

United States Patent Office 3,304,578
Patented Feb. 21, 1967

3,304,578
PELLETING MACHINE
Francis H. Clute, Rocky Ford, Colo., assignor to Francis H. Clute & Son, Inc., Rocky Ford, Colo., a corporation of Colorado
Filed Dec. 29, 1964, Ser. No. 421,934
3 Claims. (Cl. 18—12)

This invention relates to material-handling apparatus and, more particularly, to a machine for forcing material through constricted passages under great pressure so that the material extruded from the passages will be in a highly compacted condition and in the form of pellets ready for any one of a variety of uses.

It is the primary object of the present invention to provide a material pelleting machine of improved construction having means for conveying the material toward and into extrusion structure and thereafter progressively increasing the pressure on the material by improved pressure-applying structure so that the material will be effectively extruded from the machine in the form of highly compacted pellets in lengths suitable for a number of different uses.

Another object of the present invention is to provide a pressure-applying member adjacent the extrusion structure of the type described and constructed in a manner so as to provide improved material-receiving pockets of decreasing volume as the extrusion structure is approached to thereby provide means cooperable with the extrusion structure for compressing the material as the same moves toward and into the extrusion structure.

Still another object of the present invention is the provision of a pressure-applying member of the aforesaid character which is provided with a number of rotatable, circumferentially spaced fins disposed to advance the material toward the extrusion structure and to present the pockets of decreasing volume for receiving the material whereby the fins, upon rotation, advance the material into the pockets and thereafter into the extrusion structure.

Still another object of the present invention is the provision of a pressure-applying member of the type described having a number of circumferentially spaced fins radiating from a rotatable hub so that the pressure required to extrude a quantity of material will be distributed uniformly over all of the fins so that damaging stresses will not be experienced by any one of the fins.

Another object of the present invention is the provision of a pelleting machine of the type described which is provided with improved extrusion means constructed in a manner so as to bond the material passing therethrough in a highly compacted form while at the same time utilizing, insofar as possible, depending upon the moisture content of the material to be pelleted, the moisture content of the material itself as an exudate for presenting a bonding agent for the material.

Yet another object of the present invention is the provision of a machine for pelleting material in a manner to exude its moisture content by pressure and at the same time develop sufficient pressure and utilize the same so that the heat of friction will bond the extruded material within the exudate.

A further object of the present invention is the provision of apparatus for adding a bonding agent to the material where necessary, as for example, when the moisture content of the material is low, and to introduce the bonding agent into the material at a strategic point, namely, at the time and at the zone of extrusion.

A still further object of the present invention is the provision of a machine of the aforesaid character which chops the material preferably in progressive stages prior to the introduction of the material into the pelleting means whereby, through use of pressure, the moisture of the material is better exuded and utilized more efficiently as a bonding agent.

Another object of the present invention is to provide a machine for pelleting materials by the creation of enough heat of friction to melt or vaporize the bonding agent whether emanating from the material itself or taking the form of an additive so that such agents effectively hold the material together in pellet form.

Still another object of the present invention is to provide pelleting means having auxiliary heat structure coupled therewith where necessary or desirable so as to enhance the melting and vaporization of the bonding agent or agents.

In the drawings:
FIGURE 1 is a vertical, cross-sectional view of one embodiment of the pelleting machine of the present invention, illustrating the pressure-applying members at each end of conveyor means and disposed within respective pelleting heads for pelleting material;

FIG. 2 is a perspective view of one end of the conveying means and illustrating the pressure-applying member adjacent thereto;

FIG. 3 is a perspective view of the opposite end of the conveying means and illustrating the pressure-applying member adjacent thereto;

FIG. 9 is a fragmentary, side elevational view of a pelleting machine utilizing the structure shown in FIGS. 1–8 and provided with means for collecting and cooling the pellets as the same emanate from the pelleting heads;

FIG. 10 is an end elevational view of the structure shown in FIG. 9;

FIG. 15 is still another embodiment of the machine of the present invention and illustrating the material-chopping means thereon spaced from the pelleting head thereof;

FIG. 16 is a fragmentary, enlarged, vertical, cross-sectional view of the machine of FIG. 15 illustrating the construction of the pelleting head thereof;

FIG. 17 is a cross-sectional view taken along line 17—17 of FIG. 15;

FIG. 18 is a perspective view of the pressure-applying member disposed within the pelleting head of FIGS. 15 and 16; and FIG. 19 is a vertical, cross-sectional view of a modified form of the pelleting head for the machine of FIGS. 15–18 and showing heater means coupled with the head.

Figure 4:
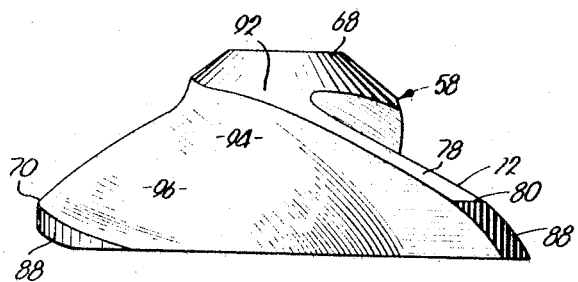
FIG. 4 is an enlarged, side elevational view of the pressure-applying member of FIG. 3 illustrating the circumferentially spaced fins thereon.

The first embodiment of the present invention, illustrated in FIG. 1, is broadly denoted by the numeral 20 and is comprised of an elongated, tubular casing or cylinder 21 provided with an opening 23 therein intermediate the open ends 25 and 27 thereof, opening 23 serving as a material inlet therefor. Casing 21 is provided with a pair of lugs 29 adjacent each of said ends 27 and 25 for providing anchor means for lug bolts 22 which are threadably received within threaded bores 24 in cylindrical portions 26 of a pair of hollow, perforated heads or caps 28 and 30 disposed in normally closing relationship to ends 25 and 27 respectively of casing 21. Each of said heads 28 and 30 is provided with a plurality of perforations 32 providing material-receiving passages for heads 28 and 30. Perforations 32 extend between frusto-conical inner and outer surfaces 34 and 36 respectively so that the direction of movement of material through the perforations 32 is at an angle relative to the direction of movement of the material through casing 21.

Each of said heads 28 and 30 is provided with a tubular portion 37 having a recess 38 therein for receiving a bearing 40 rigidly secured to a corresponding end of an elongated shaft 42, it being clear that the shaft extends through openings 44 and 46 centrally disposed within heads 28 and 30 respectively. Shaft 42 thereby spans the distance between heads 28 and 30 and is adapted to be operably coupled with the source of power for rotating shaft 42 about the longitudinal axis thereof.

A sleeve 48 is secured to and surrounds shaft 42 within casing 21. A screw conveyor or auger is secured to sleeve 48 and includes a pair of helical conveyor blades 50 and 52. Blade 50 originates adjacent opening 23 and terminates adjacent end 25 of casing 21. Blade 52 originates adjacent opening 23 and terminates adjacent end 27. Blades 50 and 52 are arranged on sleeve 48 so that material engaged by blade 50 is moved toward end 25, and material engaged by blade 52 is moved toward end 27. It is clear, therefore, that blades 50 and 52 have right-hand and left-hand threads respectively.

A funnel 54 is received within opening 23 of casing 21 and secured to a collar 56 integral with casing 21 in surrounding relationship to opening 23. Funnel 54 is utilized to direct material to be extruded into casing 21 through opening 23 so that the blades 50 and 52 may convey the material to the opposite ends 25 and 27 respectively, responsive to the rotation of shaft 42.

A pair of pressure-applying members 58 and 60 is disposed in heads 28 and 30 respectively for advancing material directed to the corresponding ends 25 and 27 into and through the perforations 32 of the corresponding head. Members 58 and 60 are illustrated in FIGS. 2 and 3 respectively, wherein the members 58 and 60 are shown secured to shaft 42 and operably coupled with the helical blades 50 and 52 respectively for receiving material conveyed by the latter through casing 21 to the corresponding ends 25 and 27. Members 58 and 60 include fin means which have oppositely directed threads corresponding to the threads of the corresponding blades 50 and 52.

Member 58 is provided with a cylindrical hub 62 having a central bore 64 therethrough for mounting hub 62 on shaft 42. A keyway 66 is disposed in hub 62 adjacent bore 64 for receiving a key therein to maintain member 58 in a fixed position on shaft 42.

Hub 62 is provided with a substantially frusto-conical, innermost end 68 which is adapted to complementally engage the corresponding annular portion of the innermost surface 34 of head 28. Since member 58 rotates relative to head 28, the annular portion of the aforesaid inner surface 34 provides a bearing surface over which end 68 slidably passes.

A number of vanes or fins 70, 72 and 74 are secured to and radiate from hub 62 toward the inner surface 34 of head 28. Each of said fins 70, 72 and 74 is provided with a side 76 which generally faces the inner surface 34 of head 28, and is further provided with a generally arcuate, innermost edge 78 which complementally engages the inner surface 34 of head 28. Edge 78 is substantially tangential to end 68 of hub 62 and curves away from inner surface 34 and about hub 62 as the outermost extremity of edge 78 is approached. In FIG. 4, the outermost extremity 80 of the corresponding edge 78 is spaced laterally, circumferentially and outwardly relative to end 68 of hub 62.

Figure 6:
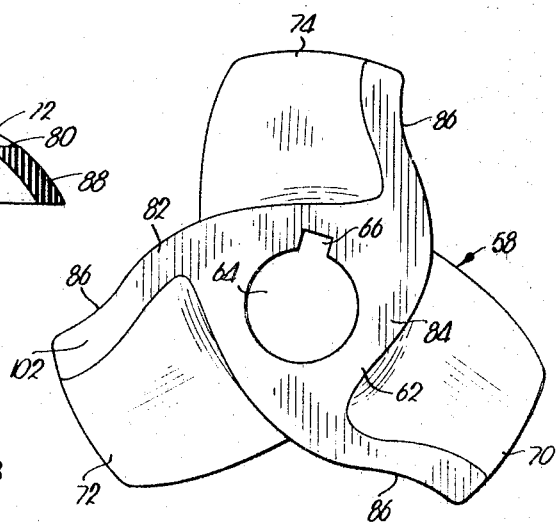
FIG. 6 is a bottom plan view of the member of FIG. 4.
Figure 5:
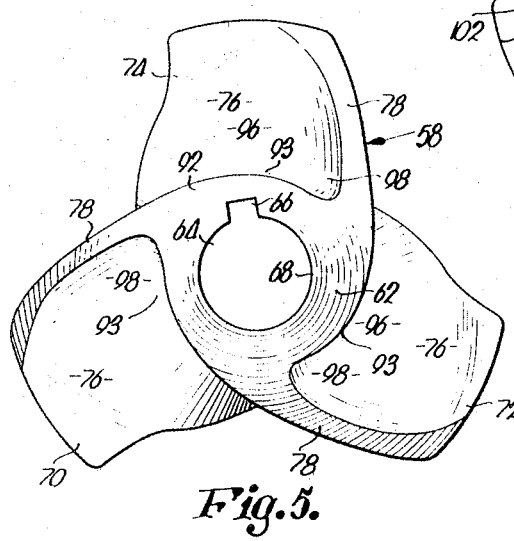
FIG. 5 is a top plan view of the member illustrated in FIG. 4.
Figure 7:
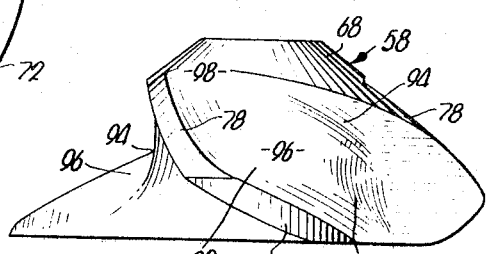
FIG. 7 is a view of the member similar to the view shown in FIG. 4 but with the member rotated through an arc of approximately 90° about its own axis.
Figure 8:
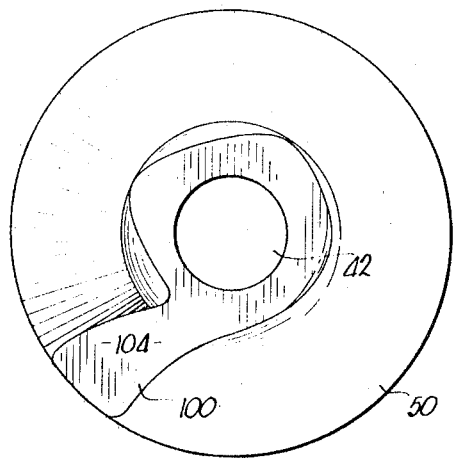
FIG. 8 is an end elevational view of the conveying means illustrated in FIG. 3 and showing the extremity thereto to be mated with the corresponding pressure-applying member.
Figures 11, 12:
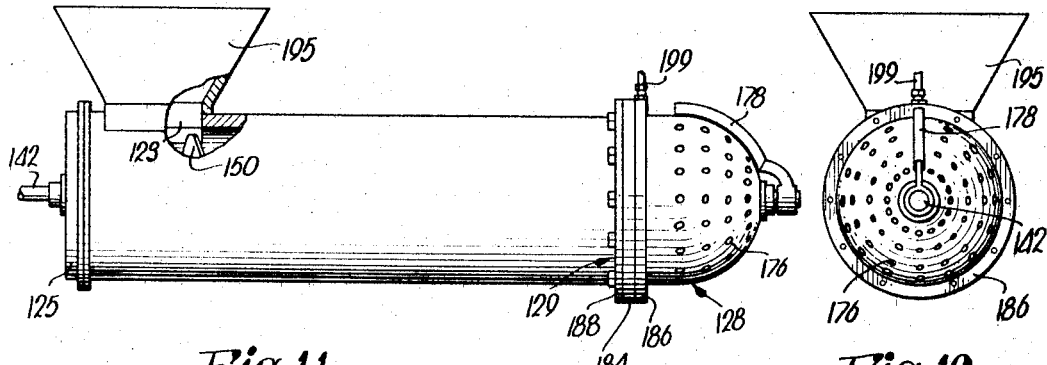
FIG. 11 is a side elevational view of another embodiment of the present invention illustrating a casing containing a conveyor and provided with a material-receiving opening at one end thereof and a pelleting head at the opposite end thereof.
FIG. 12 is an end elevational view of the machine illustrated in FIG. 11.

Each of the fins 70, 72 and 74 is provided with an outermost edge 82 which, with the corresponding edge 78, presents the corresponding side 76 therebetween. Edge 82 of each of the aforesaid fins is substantially tangential to the outermost flat end 84 of hub 62 as viewed in FIG. 6, the edges 82 being slightly arcuate in the regions 86 as the outermost extremities thereof are approached. An arcuate segment 88 interconnects edges 78 and 82 which form a corresponding side 76, and it is noted that segments 88 are complemental to a cylindrical envelope surrounding member 58. To this end, segments 88 complementally engage the inner annular portion 90 of cylindrical portion 26 of head 28.

It is to be understood that the corresponding edges 78 and 82 which form a side 76, extend outwardly from hub 62 on diametrically opposed sides of the latter adjacent innermost and outermost ends 68 and 84 respectively. It is, therefore, evident that the base of each side 76 substantially spans the distance between the ends 68 and 84 of hub 62 to thereby dispose the plane of each side 76 at an angle relative to the direction of motion of material passing through casing 21. The material will thus be caused to move circumferentially as well as axially under the influence of fins 70, 72 and 74. Each innermost edge 78 is provided with a projecting portion 92 which partially overlies the side 76 of an adjacent fin. The projection 92 merges with the adjacent fin to form a concave area 94 which provides a relatively smooth surface for material slidably advancing over the corresponding fin toward head 28.

The edges 78 and 82, and the corresponding side 76, form with the inner surface 34 of head 28 an elongated pocket 96 extending axially and circumferentially and thereby spirally relative to shaft 42 and which is adapted to receive and advance material toward perforations 32 of head 28. Pocket 96 decreases in volume as the axis of revolution of hub 62 is approached, and a zone 98 communicating with pocket 96 and disposed between the regions at which adjacent edges 78 merge with end 68, is disposed to advance the material into the perforations into a compacted form, owing to the decrease in volume of pocket 96 and zone 98 as the same approach hub 62. A convex face 91 merges with a concave face 93 to form each pocket 96 respectively, face 93 remaining concave and extending into zone 98 in a direction inclined relative to the path of the material through casing 21. Each of the pockets 96 has an inlet mouth 89 for receiving material from the screw and each pocket increases in width and depth as the corresponding mouth 89 is approached. Thus, each pocket extends at an angle axially outwardly away from the corresponding conveyor blade and radially inwardly toward the axis of rotation of the corresponding member.

One of the fins 70, 72 or 74 merges with the outermost extremity of helical blade 50 as is clear in FIG. 2, it being noted that fin 70 merges with the outermost extremity 100 of helical blade 50 to form a continuous path from inlet opening 23 to head 28.

Fin 70 is provided with a flat surface 102 which mates with and engages the flat surface 104 at extremity 100 so that there is no interruption between the surface of blade 50 and the side 76 corresponding to fin 70. Since edges 82 are substantially coplanar, the edges 82 of fins 72 and 74 are circumferentially spaced from the junction of fin 70 with extremity 100 so that the fins 72 and 74, when the same rotate under the influence of shaft 42, advance predetermined amounts of material toward head 28, while fin 70 advances the amount remaining at any given point adjacent end 16. By virtue of this construction, the material conveyed toward the perforations 32 of head 28, is divided into substantially equal amounts and these amounts are advanced to the head 28 by the individual fins 70, 72, and 74. It is clear that the pressure required to advance the aforesaid amounts is thus divided into the number of fins carried by hub 62 to thereby distribute the pressure over the fins rather than have one fin do substantially all of the work required to advance the material to head 28.

Member 60 is similar in all respects to member 58 except that member 60 is provided with fins which are oppositely disposed on the corresponding hub to thereby cooperate with helical blade 52 to advance material to the perforations 32 of head 30. The description of member 60 will, therefore, be omitted.

To prevent the longitudinal movement of each of members 58 and 60 relative to shaft 42, a setscrew 106 is disposed within the hubs of members 58 and 60 intermediate the ends of the hubs, and frictionally engageable with shaft 42 for maintaining members 58 and 60 in fixed positions relative to the shaft 42.

Fins 70, 72 and 74 are disposed so that the sides 76 thereof substantially prevent retrograde movement of the material as the latter passes toward the corresponding heads 28 and 30.

In operation, material to be pelleted is directed into funnel 54 and thus into casing 21 where it is acted upon by blades 50 and 52 to advance the same in opposed directions toward pressure-applying members 58 and 60. Shaft 42 is rotated in a direction to effect the outward movement of the material toward members 58 and 60 by being coupled with a suitable prime mover in any suitable manner such as by chain and sprocket means. The material being advanced by blades 50 and 52 tends to move radially outwardly toward casing 21 and thus enters mouths 89 of pockets 96 generally at the radially outermost extremities thereof.

The material passes into the pockets 96 formed by fins 70, 72 and 74, and the continued rotation of the fins causes the same to cooperate with the inner surface of the corresponding head to force the material axially outwardly relative to the corresponding blade and radially inwardly relative to the axis of rotation of the corresponding member. The material then moves into zones 98 which communicate with the corresponding pockets 96. It is clear that as the material moves axially and radially inwardly, the material is subjected to extremely high pressures before it is directed into the perforations of the heads. This is effected by the fact that the material thus moves into a region of progressively decreasing volume. The extruded or pelleted material will be in a highly compacted form which is suitable for a variety of uses, depending upon the type of material and the moisture content thereof.

The dispositions of fins 70, 72 and 74 are such that the same prevent any substantial retrograde movement of the material in pockets 96 so that there is no relaxing or decreasing of the pressure prior to the passage of the material through perforations 32. Members 58 and 60 do not, therefore, rely upon the material in casing 21 to prevent such retrograde movement of the material.

The generally smooth surfaces on the fins 70, 72 and 74 and hub 62 which define pockets 96, eliminate any tendency for the material to be lodged in cavities and prevented from passing outwardly of the corresponding heads.

The material extruded or pelleted from heads 28 and 30 is permitted to gravitate into receptacles 71 which underlies the major portions of the corresponding heads 28 and 30 at the ends of casing 21. As shown in FIGS. 9 and 10, each receptacle 71 has an open top and an open bottom and is provided with an inclined wall 73 having an opening (not shown) therein which communicates with a tube 75 coupled with the pressure side of a blower 77.

Blower 77 is operated by an electric motor 79 through belt and pulley means 81 to direct air into tube 75 and then into receptacle 71. Suitable baffle means may be employed for directing the air downwardly in receptacle 71 onto a perforated plate 83 which supports the pellets after the same gravitate from the head thereabove. The air continues to pass through the plate after cooling the pellets thereon.

An inclined pipe 85 communicates with the interior of receptacle 71 adjacent plate 83 and is adapted to be coupled with a source of suction to draw the pellets upwardly out of receptacle 71 to a collection point remote from the apparatus. As shown in FIG. 9, one of the receptacles 71 is disposed adjacent chain and sprocket means 87 coupled with a drive shaft 89 of a suitable prime mover for rotating shaft 42.

It is seen that the pellets are cooled by the air passing into receptacle 71 from blower 77 before the pellets are elevated through pipe 85 and directed to the collection area.

Another embodiment of the instant invention is illustrated in FIGS. 11–14 and includes a casing 121 having an inlet opening 123 at one end thereof adjacent a closure 125 for closing the corresponding end. The opposite end of casing 121 is open and has a dome-shaped, perforated head 128 coupled therewith by suitable flange means 129, head 128 having a hemispherical inner surface. A shaft 142 is journalled in closure 125 and head 128 centrally of casing 121 for rotation relative to the latter. A suitable prime mover is coupled with shaft 142 to effect the rotation thereof. A helical conveyor or blade 150 is rigid to and extends longitudinally of shaft 142 within casing 121 for advancing material entering opening 123 toward and into head 128. A pressure-applying member 158 is also rigid to shaft 142 at the end thereof adjacent head 128 and member 158 is complementally disposed within head 128 for rotation relative to the latter.

Member 158 includes a hub 160 rigid to shaft 142 and is provided with a number of outwardly extending vanes 162 preferably integral with hub 160. Each vane 162 is provided with an outermost edge 164 that is convex to conform complementally to the concave configuration of the inner face of head 128. In addition, edge 164 is longitudinally arched so that one face 166 of the corresponding vane is concave adjacent edge 164, and the opposite face 168 is convex adjacent edge 164. However, each vane 162 is provided with a reverse bend or compound curve so that face 166 thereof becomes convex and face 168 thereof becomes concave as trailing edge 170 of the vane is approached. Each edge 170 is provided with a double curve in much the same manner as the corresponding edge 164. Each edge 172 of each vane 162 which joins to and merges with hub 160, is formed in a compound curve since it is concave adjacent edge 170 and convex as head 128 is approached.

Vanes 162 form elongated pockets 174 having inlet mouths 175 at the larger extremity of the head 128 and which decrease in volume as head 128 is approached. Pockets 174 extend axially outwardly of blade 150, as well as radially inwardly toward hub 160 and thus are spirally disposed relative to the axis of rotation of hub 160. Material advanced into head 128 by blade 150 is thus caused to advance toward head 128 along a path inclined to the path through casing 121. Simultaneously therewith, the material is forced into a region of progressively decreasing volume since the width and depth of each pocket 174 decreases as head 128 is approached. Thus, extremely high pressures will be exerted on the material before the same is forced into and through the perforations 176 of head 128.

The configuration of each vane 162, especially in the region adjacent face 168 thereof, is such as to prevent any substantial retrograde movement of the material and as a result, the material is effectively retained within pocket 174 formed by the vane and the vane adjacent thereto.

A cutter blade 178 is rigid to shaft 142 at the outer end thereof adjacent head 128. Blade 178 is complemental to the outer surface of head 128 to sever the pellets into discrete lengths, depending upon the speed of rotation of shaft 142.

Head 128 includes a pair of complementally mating sections 180 and 182 that are provided with annular, outturned flanges 184 and 186 which form flange means 129. Flanges 184 and 186 are coupled with a similar flange 188 on casing 121 by bolts 190. Sections 180 and 182 are held out of interengagement except at flanges 184 and 186 by a plurality of small spacers 192 therebetween presenting a narrow space 194. Spacers 192 may form an integral part of either of the inner concave faces of section 182 or the outer convex face of section 180.

Figure 13:
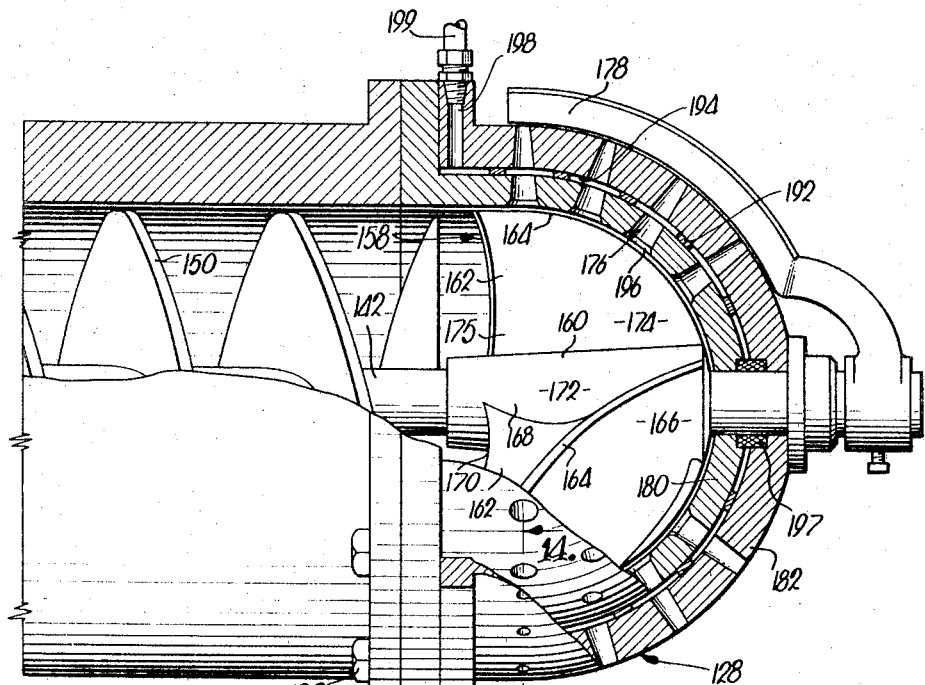
FIG. 13 is an enlarged, fragmentary, side elevational view partly in cross section of the machine of FIGS. 11 and 12 and illustrating the details of construction of the pelleting head.
Figure 14:
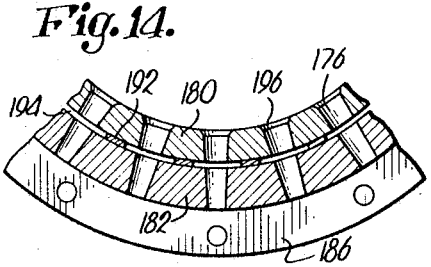
FIG. 14 is a cross-sectional view taken along line 14—14 of FIG. 13.

Sections 180 and 182 are provided with aligned openings therethrough to form perforations 176, the latter being substantially frusto-conical as is clear in FIGS. 13 and 14. A flared counterbore 196 for each perforation 176 respectively, increases the diameter thereof adjacent the inner surface of section 180.

Space 194 is provided to permit the introduction of fluids, as for example, supplemental bonding agents when such is desired or becomes necessary. To this end, flange 186 of section 182 is provided with a plurality of radial bores, only one of which is illustrated in FIG. 13 and designated by the numeral 198. Bore 198 communicates at its inner end with space 194 and is adapted to have a conduit 199 operably coupled therewith.

Any suitable moisture control fluid may be employed, as for example, a mixture of heavy molasses and methylcellulose diluted with water. Such a preparation provides a viscosity and emulsion control, together with sufficient bonding to hold the material together to form pellets whenever the material has insufficient moisture content to produce a desirable pellet through use of the machine without addition of the solution.

The bonding agent may be stored in a suitable tank remote from casing 121 and the same may be forced into bores 198 by the use of pump means coupled with conduits 199. Also, the bonding agent may be directed into casing 121 for admixture with the material as the latter is conveyed by blade 150 to head 128. Packing 197 around shaft 142 adjacent space 194, prevents the bonding from flowing from head 128 through the opening therein that clears shaft 142.

In operation, material is fed into a funnel 195 aligned with opening 123 so that the material gravitates into casing 121 and is acted upon by blade 150. The material is then directed into the pockets 174 formed by vanes 162 and thereafter forced into perforations 176 for extrusion through head 128. The extruded material is severed into particles by blade 178 upon rotation of the latter under the influence of shaft 142. During the extrusion, a suitable bonding agent may be directed into space 194 for effectively bonding the material together as the same is extruded.

The embodiment of FIGS. 11–14 is adapted to pellet many types of material and is especially adapted to handle grasses of all types including, for example, alfalfa hay. If the material has an adequate moisture content, it will be unnecessary to use the supplemental bonding agents. Member 158 operates with great force and creates a sufficient pressure to exude the moisture from the material. The pressure is sufficient also to create enough heat of friction to bond the material with the exudate as such material is extruded through perforations 176. The pressure exerted on the material progressively increases from the time it enters head 128 and pockets 174 until it issues from the outer ends of perforations 176. This is assured by virtue of the configuration of perforations 176.

The effect of pressure, in addition to exudation of the moisture content of the material, is to melt and/or vaporize the moisture because of the heat that is developed. In this way, the exudate provides the bond that is necessary to hold the pellets in a compact mass. The moisture exuded from the material also provides the necessary lubrication to cause the material to slide through perforations 176 without clogging, while at the same time maintaining the heat of friction that is necessary as above described. After a short period of use, head 128 will become heated and remain at an elevated temperature to enhance the pelleting operation.

When the bonding solution is directed into space 194, the same is, of course, fed directly to the material passing through perforations 176. There is no loss of the bonding solution since it is all absorbed by the material as it passes through perforations 176. The bonding agent is fed in equal amounts to all perforations 176 and, therefore, the material extruded will substantially be uniformly compacted.

Cutter blade 178 is preferably releasably coupled with shaft 142 so that head 128 may be replaced by a head having perforations of greater or lesser dimensions.

Another embodiment of the instant invention is illustrated in FIGS. 15–18 and the same includes a casing 221 having an inlet opening 223 adjacent a closed end of casing 221 and in register with a funnel 295 adapted for receiving material to be extruded or pelleted. A pelleting head 228 is coupled to the open, opposite end of casing 221 for receiving and extruding the material passing through casing 221 under the influence of a helical conveyor blade 250 rigid to and rotatable with a shaft 242 journaled in the closed end of casing 221 and in head 228. A suitable prime mover may be coupled with shaft 242 to effect the rotation of the same in a direction to cause the advancing of material toward head 228 under the influence of blade 250.

In many respects, the embodiment of the invention of FIGS. 15–18 is the same as the embodiment illustrated in FIGS. 11–14. However, casing 221 is provided with mechanisms 225 and 227 for chopping the material as the same is advanced toward head 228. Mechanism 227, illustrated in FIG. 17, includes a foraminous disc 229 across the open end of casing 221. Disc 229 is held in place by an annular spacer 230 between flanges 232 and 234 and casing 221 and head 228 respectively. Bolts 236 interconnect flanges 232 and 234 together so as to couple head 228 to casing 221.

Mechanism 227 also includes a cutter 238 secured to shaft 242 for rotation therewith. The sharpened leading edges of the blades of cutter 238 move along the proximal face of disc 132 within casing 221 to chop the material as it is forced through foramina 240 in disc 229.

Mechanism 225 is provided with a foraminous disc 229 which is held in place in any suitable manner intermediate the ends of casing 221. A cutter 238 is disposed in proximity to one face of disc 229 and secured to shaft 242 for rotation therewith. Mechanisms 225 and 227 differ only in that the foramina 240 of disc 229 of mechanism 225, are larger than that of disc 229 of mechanism 227.

Head 228 is provided with a pair of sections 246 and 248 which are held apart to provide a space 250 therebetween by a joint 252 between the sections. Bonding agents or the like may be introduced into space 250 through one or more bores 254 in section 248. A conduit 256 is in communication with each bore 254 adapted to be coupled with the source of the bonding agent for directing the agent into space 250 under the influence of a pump or the like. A cutter blade 257 is coupled to shaft 242 for rotation therewith to in turn sever the material extruded through the frusto-conical perforations 258 formed in sections 246 and 248.

A pressure-applying member 260 is secured to shaft 242 within head 228 adjacent mechanism 227. Member 260 is provided with a hub 261 having a number of vanes 262 thereon, each vane 262 having an edge 264 that conforms to the frusto-conical, inner face of section 246 and an edge 265 which joins with edge 264 through the medium of an edge 267. Edges 264 and 265 project outwardly from the same side of hub 261. Otherwise, vanes 262 are of substantially the same shape and configuration as vanes 162 described above. In this respect, each pair of adjacent vanes 262 form an elongated pocket 266 therebetween which decreases in width and depth and thereby in volume as head 228 is approached and which is provided with an inlet mouth 267 adjacent mechanism 227. Vanes 262 cooperate with the inner surface of section 246 to effect this decrease in volume, and also vanes 262 are configured to direct the material circumferentially, as well as axially. Pockets 266 thus extend spirally with respect to the axis of rotation of member 260. The material thus flows along a path inclined relative to the path of the material through casing 221. The configuration of the vanes 262 at the portions thereof adjacent mechanism 227 is such as to prevent retrograde movement of the material so that reliance is not solely required on the material issuing through the disc 229 of mechanism 227 for preventing this retrograde movement of the material within pockets 266.

In operation, the material enters casing 221 through opening 223 and is first chopped by passing through mechanism 225 into a predetermined particle size. The material thereafter continues on through casing 221 and is further chopped to a smaller particle size by passing through mechanism 227. The material then passes into pockets 266 and vanes 262 effectively force the material through the frusto-conical perforations 258 formed in sections 246 and 248. The blade 257 severs the pelleted material into discrete lengths, depending upon the speed of rotation of shaft 242.

If desired or required, a bonding agent may be directed into space 250 from the source coupled with conduit 256. The bonding agent in space 250 admixes with the material and forms an exudate in the same manner described above.

Mechanisms 225 and 227 effect the extraction of juices from the material passing through casing 221 and, in many cases, the pelleting procedure is benefited by this step in the pelleting method.

A dome-shaped head 328 is illustrated in FIG. 19 and is to be used in lieu of the head 228 when it is desirable or becomes necessary to add heat to the material as the same is being extruded. The outer section of head 328 is of considerable mass to absorb heat from heating elements 330 embedded in head 328. The heat absorbed by head 328 is transferred to the material as it passes through the tapered perforations 332 in head 328. Head 328 is otherwise substantially the same as head 228.

Elements 330 are releasably attached to head 328 and adapted to be coupled with a source of electrical energy. By providing such secondary heat, the heat that is provided by friction is augmented and the pelleting action takes place in substantially the same way as in the embodiments previously described.

Having thus described the invention, what is claimed as new and desired to be secured by Letters Patent is:

1. In a pelleting machine having a casing provided with an inlet and a screw rotatable in the casing with the screw being provided with a helical blade disposed to advance material to be pelleted from the inlet toward one end of the casing, there being a hollow, perforated head across said one end and provided with a frusto-conical, inner surface presenting an open, material-receiving extremity, the surface increasing in diameter as said casing is approached, the improvement in combination comprising a pressure member within the head, said pressure member comprising:
   a cylindrical hub mounted on the screw for rotation therewith; and
   a plurality of equispaced fins rigidly secured to said hub and radiating therefrom in the spiral direction of said blade,
   each of said fins having a pair of opposed edges extending from corresponding ends of said hub and presenting therebetween a side generally facing said inner surface,
   the outermost edges lying in a common plane disposed normally of the hub and adjacent the blade, the edges extending tangentially from the hub,
   the innermost edges extending tangentially from the hub and being inclined toward corresponding outermost edges to present a longitudinal surface complementally engaging the inner surface of the head in substantially spanning relationship to the extremities thereof,
   the edges of each fin being joined at their outer ends by an arcuate segment, said segments extending circumferentially and lying complementally within a cylindrical envelope surrounding the member and concentric therewith,
   said fins cooperating with said inner surface of the head to present corresponding elongated, spiral pockets communicating with said casing, the pockets extending axially inwardly of said hub, and being of progressively decreasing volume as the innermost edges approach the axis of revolution of said hub,
   whereby each of said pockets receives material from said blade and advances the same toward and into the perforations of the head by the pressure exerted on the material by the corresponding side responsive to the rotation of said hub.

2. The invention of claim 1, the longitudinal surface of each of said innermost edges being arcuate to present a concave face in the corresponding side, said concave face merging with a convex face in the side presented by the curvature of said arcuate segment and terminating at said outermost edge.

3. The invention of claim 2, each innermost edge including a projecting portion overlying the side of the proximal, adjacent fin, the portion merging with said side of the adjacent fin to form a concave area to provide a smooth surface for the advancing material.

References Cited by the Examiner

UNITED STATES PATENTS

| | | |
|---|---|---|
| 2,075,476 | 3/1937 | Sizer. |
| 2,144,055 | 1/1939 | Hall _____ 18—12 |
| 2,286,405 | 6/1942 | Gordon _____ 18—12 X |

FOREIGN PATENTS 649,814  10/1962  Canada.

WILLIAM J. STEPHENSON, *Primary Examiner.*